US012793401B2

(12) United States Patent
Ishida et al.

(10) Patent No.: US 12,793,401 B2
(45) Date of Patent: Nov. 10, 2026

(54) TRAINED MODEL GENERATING METHOD, USER ENVIRONMENT ESTIMATING METHOD, TRAINED MODEL GENERATING DEVICE, USER ENVIRONMENT ESTIMATING DEVICE, AND TRAINED MODEL GENERATING SYSTEM

(71) Applicant: KYOCERA Corporation, Kyoto (JP)

(72) Inventors: Takayuki Ishida, Hirakata (JP); Hiroaki Miyamura, Fujisawa (JP); Fidelia Gracia, Osaka (JP); Kohei Moriguchi, Ibaraki (JP); Masayoshi Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 342 days.

(21) Appl. No.: 18/292,854

(22) PCT Filed: Jul. 26, 2022

(86) PCT No.: PCT/JP2022/028834
§ 371 (c)(1),
(2) Date: Jan. 26, 2024

(87) PCT Pub. No.: WO2023/008446
PCT Pub. Date: Feb. 2, 2023

(65) Prior Publication Data
US 2024/0273881 A1 Aug. 15, 2024

(30) Foreign Application Priority Data
Jul. 26, 2021 (JP) ................................. 2021-121958

(51) Int. Cl.
*G06V 10/77* (2022.01)
*G06V 10/778* (2022.01)

(52) U.S. Cl.
CPC ................................. *G06V 10/778* (2022.01)

(58) Field of Classification Search
CPC ..... G06V 10/778; G06V 10/141; G06V 10/82
See application file for complete search history.

(56) References Cited

U.S. PATENT DOCUMENTS 9,483,714 B2 11/2016 Aoba
10,198,666 B2 2/2019 Aoba
(Continued)

FOREIGN PATENT DOCUMENTS

JP 2013242825 A 12/2013
JP 2014-199584 A 10/2014
(Continued)

OTHER PUBLICATIONS

Stack Overflow, "How does adding noise to output avoid overfitting on training points?", Dec 29, 2019, 4 pages.
(Continued)

*Primary Examiner* — Tom Y Lu
(74) *Attorney, Agent, or Firm* — Procopio, Cory, Hargreaves & Savitch LLP

(57) ABSTRACT

A trained model generating method includes: acquiring a first model obtained by performing training processing for an estimation target in a first environment by using first image data representing the estimation target in the first environment as learning data; acquiring second image data representing the estimation target in a second environment in which estimation is to be performed; generating a second model based on the first model by using the second image data as learning data; and outputting a trained model based on the second model. The second image data includes an image in which an appearance of the estimation target in the second environment is assumed based on user environment information about the second environment.

15 Claims, 12 Drawing Sheets

(56) References Cited

U.S. PATENT DOCUMENTS

| | | | | |
|---|---|---|---|---|
| 10,204,404 | B2 | 2/2019 | Lu et al. | |
| 10,803,351 | B2 | 10/2020 | Aoba | |
| 11,386,546 | B2 | 7/2022 | Kobayashi et al. | |
| 2014/0294292 | A1* | 10/2014 | Aoba | G06V 10/60 382/159 |
| 2015/0086110 | A1* | 3/2015 | Nishimura | G06V 10/776 382/155 |
| 2018/0211121 | A1 | 7/2018 | Moosaei et al. | |
| 2020/0349364 | A1* | 11/2020 | Liu | G06V 20/588 |
| 2022/0309730 | A1* | 9/2022 | Cappello | G06N 3/0499 |
| 2022/0358749 | A1 | 11/2022 | Yonetani et al. | |
| 2023/0222645 | A1* | 7/2023 | Kurita | G06T 7/0004 382/100 |

FOREIGN PATENT DOCUMENTS

| | | | |
|---|---|---|---|
| JP | 2016-6627 | A | 1/2016 |
| WO | 2013/175792 | A1 | 11/2013 |
| WO | 2019/155593 | A1 | 8/2019 |
| WO | 2021/014878 | A1 | 1/2021 |

OTHER PUBLICATIONS

Butler, "What's that noise? Part one: Shedding some light on the sources of noise", Apr. 27, 2015, 11 pages.

* cited by examiner

TRAINED MODEL GENERATING METHOD, USER ENVIRONMENT ESTIMATING METHOD, TRAINED MODEL GENERATING DEVICE, USER ENVIRONMENT ESTIMATING DEVICE, AND TRAINED MODEL GENERATING SYSTEM

CROSS-REFERENCE TO RELATED APPLICATIONS

This application claims priority of Japanese Patent Application No. 2021-121958 (filed Jul. 26, 2021), the entire disclosure of which is hereby incorporated by reference.

TECHNICAL FIELD

The present disclosure relates to a trained model generating method, a user environment estimating method, a trained model generating device, a user environment estimating device, and a trained model generating system.

BACKGROUND OF INVENTION

A known system captures images of components and creates a trained model for use in image recognition of components (see, for example, Patent Literature 1).

CITATION LIST

Patent Literature

Patent Literature 1: International Publication No. 2019/155593

SUMMARY

In an embodiment of the present disclosure, a trained model generating method includes: acquiring a first model obtained by performing training processing for an estimation target in a first environment by using first image data representing the estimation target in the first environment as learning data; acquiring second image data representing the estimation target in a second environment in which estimation is to be performed; generating a second model based on the first model by using the second image data as learning data; and outputting a trained model based on the second model. The second image data includes an image in which an appearance of the estimation target in the second environment is assumed based on user environment information about the second environment.

In an embodiment of the present disclosure, a user environment estimating method is for estimating a user environment, the user environment being an environment in which data on an estimation target is to be acquired. The user environment estimating method includes outputting a result of estimating the user environment based on image data obtained by capturing a prescribed object in the user environment as user environment information about the user environment.

In an embodiment of the present disclosure, a trained model generating device includes a controller. The controller is configured to acquire a first model obtained by performing training processing for an estimation target in a first environment by using first image data representing the estimation target in the first environment as learning data. The controller is configured to acquire second image data representing the estimation target in a second environment in which estimation is to be performed. The controller is configured to generate a second model based on the first model by using the second image data as learning data. The controller is configured to output a trained model based on the second model. The second image data includes an image in which an appearance of the estimation target in the second environment is assumed based on user environment information about the second environment.

In an embodiment of the present disclosure, a user environment estimating device includes a controller. The controller is configured to estimate a user environment. The user environment is an environment in which data on an estimation target is to be acquired. The controller is configured to output a result of estimating the user environment based on image data obtained by capturing a prescribed object in the user environment as user environment information about the user environment.

In an embodiment of the present disclosure, a trained model generating system includes a trained model generating device configured to perform the trained model generating method and a user environment estimating device configured to perform the user environment estimating method. The trained model generating device is configured to acquire the user environment from the user environment estimating device.

DESCRIPTION OF EMBODIMENTS

If the environment in which a trained model is to be used for recognition is different from the environment in which the trained model was created, recognition accuracy may be degraded. In other words, the robustness of the trained model used for recognition may be reduced. According to a trained model generating method and a user environment estimating method according to one embodiment of the present disclosure, the robustness of a trained model used for recognition can be improved.

(Configuration of Trained Model Generating System 1)

Figure 1:
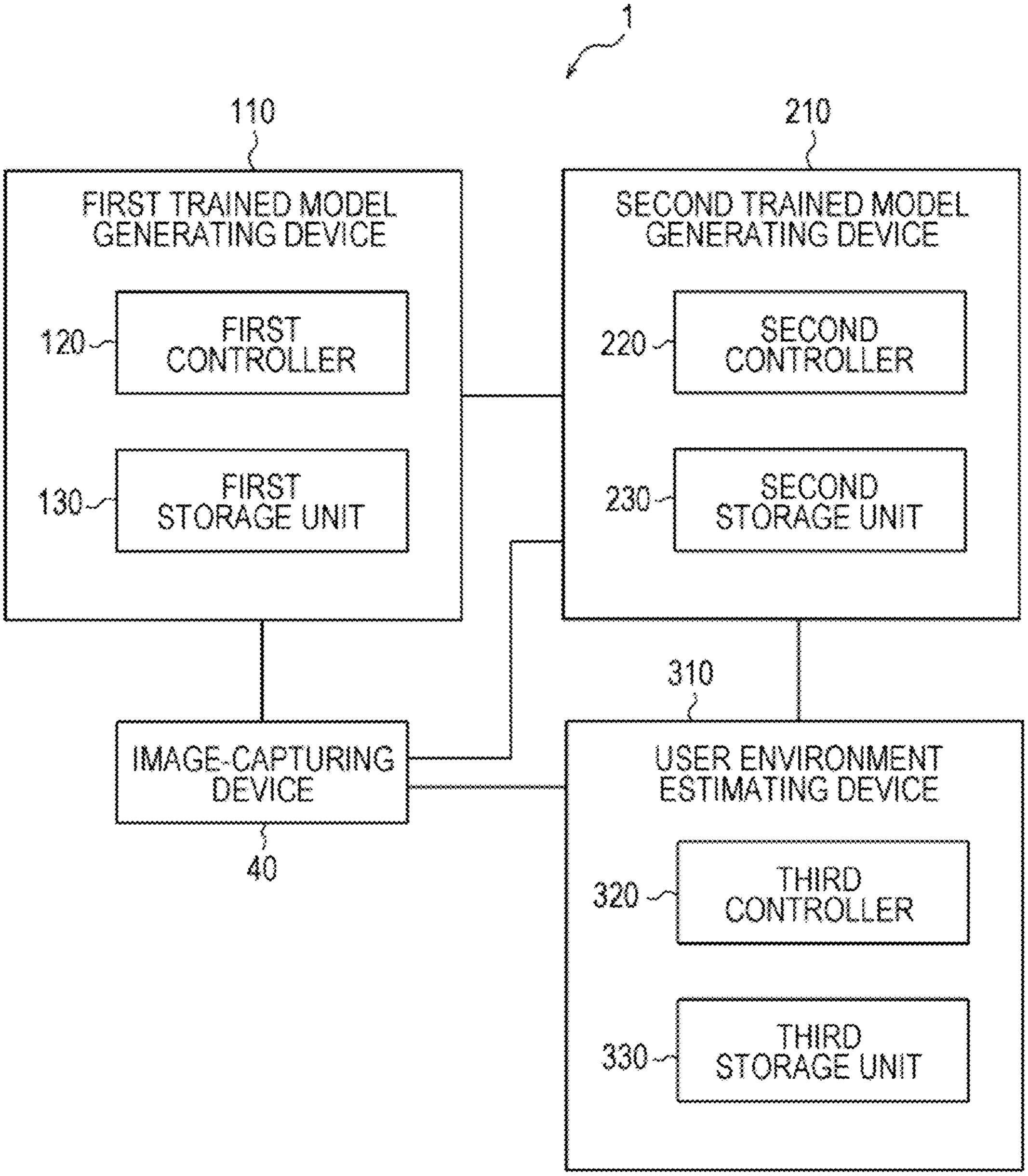
FIG. 1 is a block diagram illustrating an example configuration of a trained model generating system according to an embodiment.

As illustrated in FIG. 1, in an embodiment, a trained model generating system 1 includes a first trained model generating device 110 and a second trained model generating device 210. The trained model generating system 1 further includes a user environment estimating device 310, which is not essential. The trained model generating system 1 further includes an image-capturing device 40, which is not essential. The first trained model generating device 110 and the second trained model generating device 210 generate trained models to be used for estimating an estimation target. A trained model is an inference algorithm configured to perform specific processing on an input by applying built-in learned parameters, and to output the results of the processing. The trained model is used to estimate an estimation target. The trained model may be used, for example, to recognize a recognition target or to estimate a grasping position of a grasping target.

This trained model is set up, selected, or downloaded to a robot controller or the like that controls a robot such as a cooperative robot, and is used when the robot is to recognize a work target and so forth. Specifically, when the robot performs a task, the trained model can, for example, capture an image of an object in the work environment and, based on the captured image, determine whether or not the captured object is a work target, such as a recognition target or a grasping target, or estimate the grasping position of a grasping target. The robot can then be controlled in accordance with the result of that determination.

The first trained model generating device 110 generates a first trained model by performing training using captured images of recognition targets in a first environment or images in which the appearance of recognition targets in a standard environment is assumed as teacher data. In the present disclosure, the first environment is also referred to as a standard environment. In other words, in the following description, the term "standard environment" can be substituted by the term "first environment". The first trained model generating device 110 may acquire a captured image of a recognition target in the standard environment from the image-capturing device 40. The standard environment may be an environment that reduces effects on a captured image of the recognition target or reduces effects on an image in which the appearance of the recognition target is assumed. In other words, the standard environment may be less noisy than a user environment described below. Furthermore, when a user uses a device such as a robot equipped with a trained model, factors that may vary depending on the place of use may be smaller in the standard environment than in the user environment described below. In other words, environment information can be said to be an environment in which the factors that may vary from one environment to another in which recognition is performed are small.

The second trained model generating device 210 acquires the first trained model from the first trained model generating device 110. The second trained model generating device 210 updates the first trained model and thereby generates a second trained model by performing training using images in which the appearance of the recognition target in the second environment where recognition is to be performed is assumed as teacher data. In the present disclosure, the second environment is also referred to as the user environment. In other words, in the following description, the term "user environment" can be substituted by the term "second environment". The environment in which recognition is to be performed may be, for example, a place where a device such as a robot equipped with the final obtained trained model is to be used.

The user environment is different from the standard environment. In this embodiment, the appearance of a recognition target in the standard environment is assumed to be a standard appearance. The appearance of the recognition target in the user environment will differ from the standard appearance. Differences from the standard appearance can be said to be due to the occurrence of noise in the appearance. Therefore, differences between the user environment and the standard environment can be said to cause the occurrence of noise in the appearance of the recognition target.

The trained model generating system 1 according to this embodiment can improve the recognition accuracy for the recognition target in each environment by performing training based on the differences in the appearance of the recognition target in the individual environments. In other words, models having high robustness with respect to environmental differences can be generated. Hereafter, an example configuration of the trained model generating system 1 will be described.

<First Trained Model Generating Device 110, Second Trained Model Generating Device 210, and User Environment Estimating Device 310>

Figure 2:
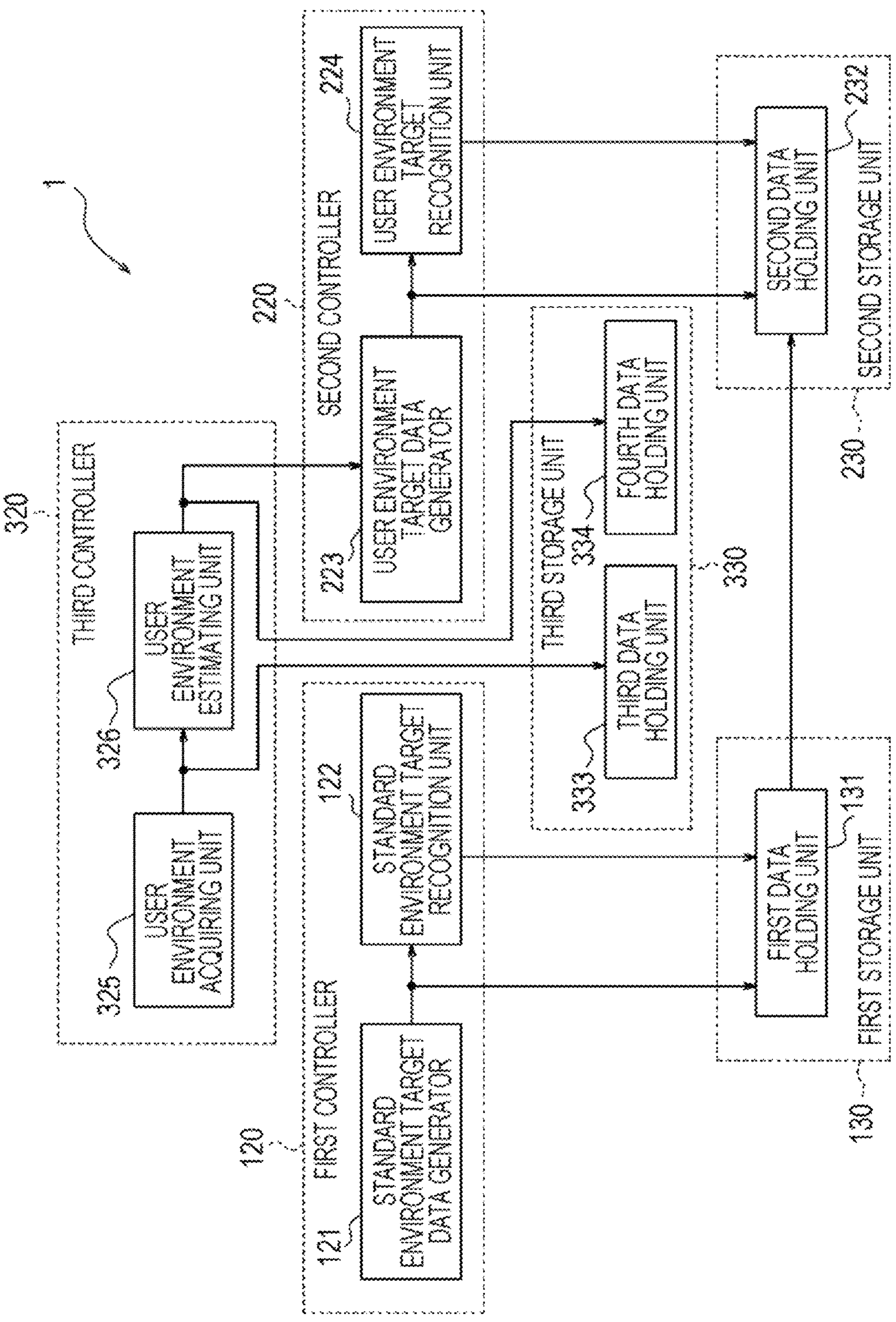
FIG. 2 is a block diagram illustrating an example configuration of functional blocks of the trained model generating system according to the embodiment.

As illustrated in FIG. 1, the first trained model generating device 110 includes a first controller 120 and a first storage unit 130. As illustrated in FIG. 2, the first controller 120 includes a standard environment target data generator 121 and a standard environment target recognition unit 122. The first storage unit 130 includes a first data holding unit 131.

As illustrated in FIG. 1, the second trained model generating device 210 includes a second controller 220 and a second storage unit 230. As illustrated in FIG. 2, the second controller 220 includes a user environment target data generator 223 and a user environment target recognition unit 224. The second storage unit 230 includes a second data holding unit 232.

As illustrated in FIG. 1, the user environment estimating device 310 includes a third controller 320 and a third storage unit 330. As illustrated in FIG. 2, the third controller 320 includes a user environment acquiring unit 325 and a user environment estimating unit 326. The third storage unit 330 includes a third data holding unit 333 and a fourth data holding unit 334.

The first trained model generating device 110 and the second trained model generating device 210 may be configured as an integrated device. The user environment estimating device 310 may be configured as an integrated device including the first trained model generating device 110 or the second trained model generating device 210.

The standard environment target data generator 121 generates first image data including an image representing a recognition target in the standard environment. The standard environment target data generator 121 may acquire an image of the recognition target captured in the standard environment from the image-capturing device 40 as an image of the recognition target in the standard environment and use this image as the first image data. The standard environment target data generator 121 may generate an image in which the appearance of the recognition target in the standard environment is assumed as the first image data. In other words, the standard environment target data generator 121 may synthesize the first image data based on design data including CAD (Computer-Aided Design) data or drawings taking the state of the standard environment into account. The standard environment target data generator 121 outputs the first image data to the standard environment target recognition unit 122. The standard environment target data generator 121 may store the first image data in the first data holding unit 131.

The standard environment target recognition unit 122 acquires the first image data from the standard environment target data generator 121. The standard environment target recognition unit 122 may acquire the first image data from the first data holding unit 131. The standard environment target recognition unit 122 generates the first trained model by performing recognition training in the standard environment using the first image data as teacher data. The first trained model is also referred to as a first model. The standard environment target recognition unit 122 stores the first model, which was generated through training using the first image data as teacher data, in the first data holding unit 131.

The user environment target data generator 223 generates second image data including an image representing the recognition target in the user environment. The user environment target data generator 223 may generate an image in which the appearance of the recognition target in the user environment is assumed as the second image data. The user environment target data generator 223 acquires information about the user environment generated by the user environment acquiring unit 325 and the user environment estimating unit 326, which are described later. The information about the user environment is also referred to as user environment information. The user environment target data generator 223 generates the second image data based on the user environment information. In other words, the user environment target data generator 223 may synthesize the second image data based on design data including CAD data or drawings taking the state of the user environment into account. The user environment target data generator 223 outputs the second image data to the user environment target recognition unit 224. The user environment target data generator 223 may store the second image data in the second data holding unit 232. The user environment target data generator 223 may acquire an image of the recognition target captured in the user environment and use the image as the second image data.

The user environment target recognition unit 224 acquires the second image data from the user environment target data generator 223. The user environment target recognition unit 224 acquires the first model from the first data holding unit 131. The user environment target recognition unit 224 performs training using the second image data as teacher data and generates a second model based on the first model. In this embodiment, the user environment target recognition unit 224 generates the second model by updating the first model. Let us assume that the first model generated by the standard environment target recognition unit 122 and stored in the first data holding unit 131 is stored in the second data holding unit 232. The user environment target recognition unit 224 updates the first model by performing reading and writing on the first model stored in the second data holding unit 232, generates the second trained model, and stores the second trained model in the second data holding unit 232. The second trained model is also referred to as the second model. The user environment target recognition unit 224 outputs the second model as a trained model. In other words, the user environment target recognition unit 224 may output a trained model based on the second model. Additionally, training may be performed using images captured in the user environment.

The first model may be stored in the first data holding unit 131. The user environment target recognition unit 224 may update the first model by performing reading and writing on the first model stored in the first data holding unit 131, generate the second model, and store the second model in the first data holding unit 131. The first data holding unit 131 and the second data holding unit 232 may be configured to be indistinguishable from each other or may be configured so as to be integrated with each other.

Although an example in which the second model is generated by updating the first model is described above, the method of generating the second model is not limited to this. For example, the second model may be generated by connecting to the first model an additional trained model that is different from the first model and has undergone training processing for the user environment. The additional trained model is also referred to as an adapter module, for example.

The user environment acquiring unit 325 acquires information to be used in estimating the user environment. The information to be used in estimating the user environment is also referred to as user environment data. The user environment data may include an image captured in the user environment. Specifically, the user environment data may include, for example, an image of the recognition target captured in the user environment, an image of the surroundings of the recognition target captured in the user environment, or an image captured without the recognition target disposed in the user environment. The user environment data may include known information such as lighting conditions in the user environment. The user environment acquiring unit 325 outputs the user environment data to the user environment estimating unit 326. The user environment acquiring unit 325 may store the user environment data in the third data holding unit 333.

The user environment estimating unit 326 estimates the user environment based on the user environment data. The user environment estimating unit 326 may acquire the user environment data from the user environment acquiring unit 325 or from the third data holding unit 333. The user environment may be specified by, for example, lighting conditions. Lighting conditions may include, for example, the position or number of lights, the type of light source, the luminance, brightness, or illuminance of the lights, the color temperature of the lights, or flicker of the lights. The type of light source may be specified based on whether the light source produces parallel light or scattered light. The type of light source may be specified as a point light source, a planar light source, or a ring light source. The user environment may be specified, for example, by the specifications or settings of the image-capturing device 40 used when performing recognition. The user environment may be specified by the conditions of an object that is present other than the recognition target such as a table on which the recognition target is placed or a wall or ceiling of the room in which the recognition target is placed. The user environment may be specified by the recognition target itself, or by a surface condition or reflectance of an object other than the recognition target. The user environment may be specified by the presence or absence of windows or blinds in the room in which the recognition target is placed when recognition is performed. The user environment may be specified by a time series of changes in the sun's rays shining on the location where the recognition target is placed when recognition is performed.

The user environment estimating unit 326 outputs estimation results of the user environment to the user environment target data generator 223 as the user environment information. The user environment acquiring unit 325 may store the user environment information in the fourth data holding unit 334. The user environment target data generator 223 may generate the second image data based on the user environment information as described above. The user environment target data generator 223 may acquire the user environment information from the user environment estimating unit 326 or from the fourth data holding unit 334. When the information to be used in estimating the user environment includes information that can specify the user environment such as lighting conditions, the user environment estimating unit 326 may output the information that can specify the user environment itself as the user environment information.

The first controller 120, the second controller 220, and the third controller 320 may each include at least one processor to realize the functions of each constituent part thereof such as the standard environment target data generator 121. The processor may execute programs that realize the functions of the constituent parts. The processor may be implemented as a circuit that realizes the functions of the constituent parts. The processor may be realized as a circuit that collectively perform the functions of multiple constituent parts. The processor may be implemented as a single integrated circuit. An integrated circuit is also referred to as an IC. The processor may be implemented as multiple integrated circuits and discrete circuits connected so as to be able to communicate with each other. The processor may include a CPU (Central Processing Unit). The processor may include a DSP (Digital Signal Processor) or a GPU (Graphics Processing Unit). The processor may be realized based on various other known technologies.

The first storage unit 130, the second storage unit 230, and the third storage unit 330 may each include an electromagnetic storage medium such as a magnetic disk, or may each include a memory such as a semiconductor memory or a magnetic memory. The first storage unit 130, the second storage unit 230, and the third storage unit 330 may be each configured as a HDD (Hard Disk Drive) or an SSD (Solid State Drive). The first storage unit 130, the second storage unit 230, and the third storage unit 330 may each include an electromagnetic storage medium or a memory corresponding to each constituent part so that data is held separately in each constituent part such as the first data holding unit 131. The first storage unit 130, the second storage unit 230, and the third storage unit 330 may be each configured to hold the data of multiple constituent parts on a single electromagnetic storage medium or memory or the like. The first storage unit 130, the second storage unit 230, and the third storage unit 330 store various information, programs executed by the first controller 120, the second controller 220, and the third controller 320, and so forth. The first storage unit 130, the second storage unit 230, and the third storage unit 330 may respectively function as work memories of the first controller 120, the second controller 220, and the third controller 320. The first controller 120, the second controller 220, and the third controller 320 may respectively include at least part of the first storage unit 130, the second storage unit 230, and the third storage unit 330.

<Image-Capturing Device 40>

The image-capturing device 40 is configured to be able to capture an image of the recognition target or an object other than the recognition target. The image-capturing device 40 may include an image-capturing element. The image-capturing device 40 may include an optical system including a lens or a mirror. The specifications of the image-capturing device 40 may be specified by resolution or sensitivity. The image-capturing device 40 may be configured to be able to change the resolution or sensitivity when capturing an image of the recognition target or an object other than the recognition target. The specifications of the image-capturing device 40 may be specified by the shutter speed or aperture. The image-capturing device 40 may be configured to be able to change the shutter speed or aperture when capturing an image of the recognition target or an object other than the recognition target.

The first trained model generating device 110, the second trained model generating device 210, or the user environment estimating device 310 and the image-capturing device 40 may be configured to be able to communicate with each other in a wired or wireless manner. The first trained model generating device 110, the second trained model generating device 210, the user environment estimating device 310, and the image-capturing device 40 may each include a communication device. The communication device may be configured to be able to perform communication using communication methods based on various communication standards. The communication device can be configured using a known communication technology. Detailed description of the hardware and so on of the communication device is omitted. The functions of the communication device may be realized by a single interface or by separate interfaces for each connection destination.

(Example Operation of Trained Model Generating System 1)

The first trained model generating device 110 generates the first model by performing training based on the first image data containing an image of the recognition target in the standard environment. The second trained model generating device 210 generates the second model by updating the first model by performing training based on the second image data containing an image of the recognition target in the user environment, and outputs the second model as a trained model.

An example of generation of the first model and an example of generation of the second model are described below.

<Example of Generation of First Model>

The first controller 120 of the first trained model generating device 110 generates the first image data containing an image of the recognition target in the standard environment. The standard environment is an environment in which images that serve as teacher data used in training to generate the first model are generated. The first controller 120 may acquire an image of the recognition target captured in the standard environment and generate the first image data containing the acquired image. The first controller 120 may generate an image assuming the appearance of the recognition target in the standard environment and generate the first image data containing the generated image. The standard environment may be an environment that at least reduces the effect of a shadow caused by the position of the light source on the captured image of the recognition target or the image in which the appearance of the recognition target is assumed.

Figure 3:
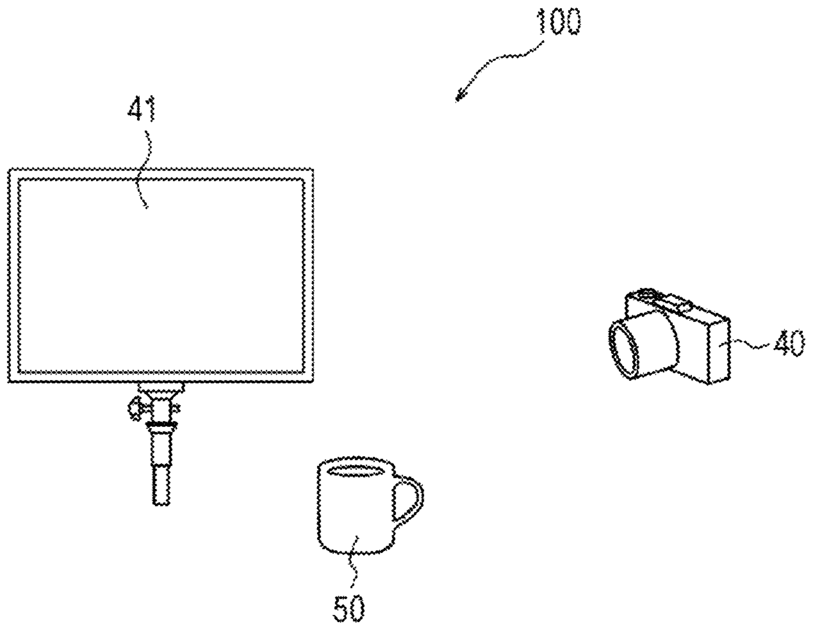
FIG. 3 is a schematic diagram illustrating an example configuration of a first environment serving as a standard environment.

The standard environment is, for example, an environment in which a cup 50, which is the recognition target, is illuminated by standard lighting 41, as illustrated in FIG. 3 as a first environment 100. The standard lighting 41 may be configured so that the recognition target does not cast a shadow. The standard lighting 41 may be configured, for example, so that light that uniformly illuminates the recognition target from all directions is emitted. The standard lighting 41 may include, for example, a panel-type lighting device. The standard lighting 41 may include multiple lighting devices. The standard environment may be a real environment or a virtual environment.

The first controller 120 performs training for recognition in the standard environment using the first image data as the teacher data and generates the first trained model.

<Generation of Second Model>

The second controller 220 of the second trained model generating device 210 generates the second image data containing an image of the recognition target in the user environment based on the user environment information. The user environment is an environment in which recognition of the recognition target is actually performed using the trained model. The second controller 220 may generate an image assuming the appearance of the recognition target in the user environment and generate the second image data containing the generated image.

Figure 4:
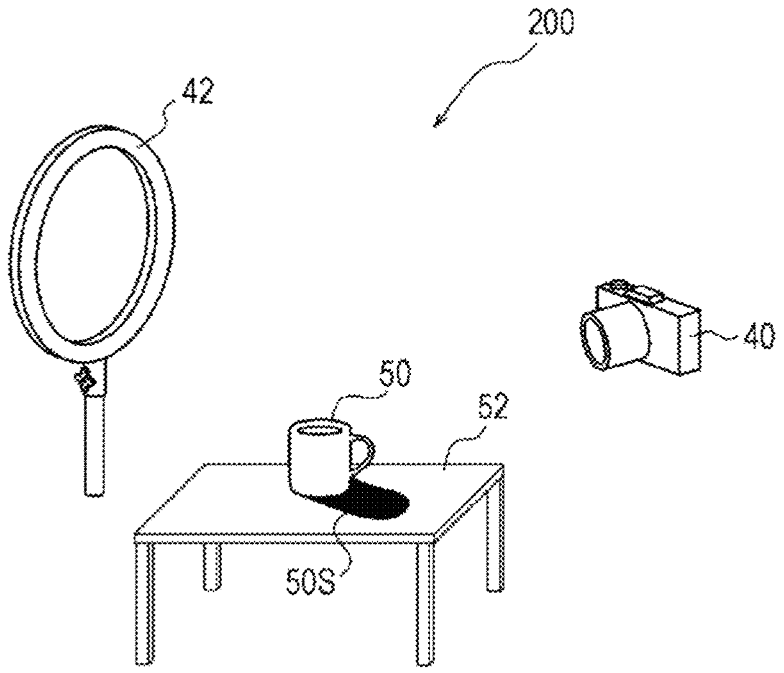
FIG. 4 is a schematic diagram illustrating an example configuration of a second environment serving as a user environment.

Let us assume that the user environment is, for example, an environment in which an image of the cup 50 placed on a table 52 is captured by the image-capturing device 40 as a recognition target, as a second environment 200 as illustrated in FIG. 4. In the example in FIG. 4, a shadow 50S of the cup 50 appears on the table 52. The second controller 220 may acquire an image of the cup 50, the shadow 50S, and the table 52, i.e., an image that specifies the appearance of the cup 50 in the user environment, and generate the second image data containing the acquired image. As described below, the second controller 220 may acquire the user environment information, generate an image assuming the appearance of the cup 50 in the user environment based on the user environment information, and generate the second image data containing the generated image.

User lighting 42 may include a ring-shaped lighting device, for example. The user lighting 42 may include a variety of lighting devices. The user lighting 42 may include multiple lighting devices. The user environment may be a real environment or a virtual environment.

The second controller 220 generates the second model by updating the first model by performing training using the second image data as teacher data. The second model generated by updating the first model can improve recognition accuracy in the user environment. The second controller 220 outputs the second model as a trained model.

<Estimation of User Environment>

Figure 5:
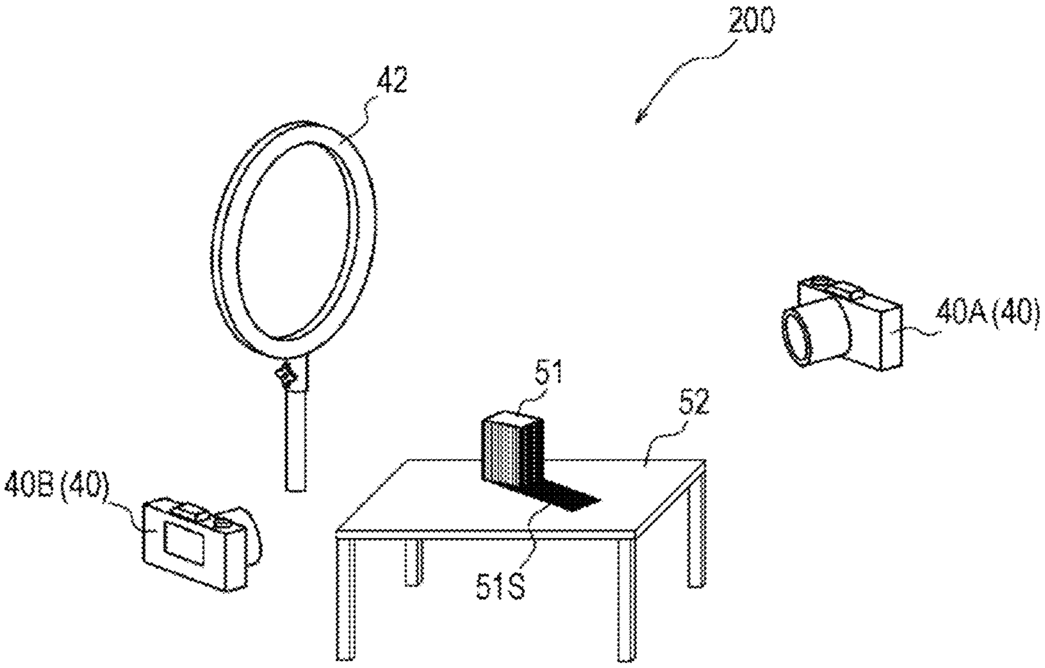
FIG. 5 is a schematic diagram illustrating an example configuration for capturing an image of a marker in the second environment.

The third controller 320 of the user environment estimating device 310 may generate the user environment information by estimating the user environment information. The third controller 320 can estimate the user environment information based on the image of the cup 50, which is the recognition target, and the shadow 50S, as illustrated in FIG. 4, for example. The third controller 320 can also estimate the user environment information based on an image of a marker 51, which is disposed in the second environment 200, and a shadow 51S, as illustrated in FIG. 5, for example. Examples of the marker 51 may include objects that are recognition targets or may include objects that are not recognition targets.

The marker 51 has at least two visible surfaces. The marker 51 is disposed so that the angles of incidence of illumination light from the user lighting 42 at the two surfaces are different from each other. The marker 51 is disposed so that the two surfaces having different angles of incidence of illumination light are captured as a single image by the image-capturing device 40. In FIG. 5, the image-capturing device 40 may include a first image-capturing device 40A and a second image-capturing device 40B. In other words, the image-capturing device 40 may be configured to capture the marker 51 from two directions. The marker 51 may be disposed so that a different surface of the marker 51 appears in an image captured from each of the directions.

Specifically, the third controller 320 estimates various conditions that specify the user environment based on the captured image of the marker 51. The third controller 320 may, for example, estimate the lighting conditions or specifications of the image-capturing device 40. The third controller 320 may estimate information about objects other than the recognition target, such as the table 52 on which the marker 51 is placed. The third controller 320 generates or acquires conditions that specify the user environment as user environment information.

The third controller 320 may generate or acquire information specifying factors responsible for noise generated in the second image data in the user environment as user environment information. The third controller 320 may generate or acquire information specifying factors that cause the differences between the first image data and the second image data as the user environment information. The third controller 320 may generate or acquire, as the user environment information, information on the position of the light source in the user environment, the intensity of light radiated from the light source, and the light source type specifying whether the light source is a point light source system or a scattered light system. The third controller 320 may generate or acquire, as the user environment information, information on the optical properties of the table (for example, the table 52) on which the recognition target is disposed, or the walls or ceiling of the room in which the recognition target is disposed in the user environment. The third controller 320 may generate or acquire, as the user environment information, information on image-capturing parameters of image-capturing means used in recognition of the recognition target or information on vibration of the image-capturing means in the user environment. The image-capturing means may include the image-capturing device 40.

<Example Procedure of Trained Model Generating Method>

Figure 6:
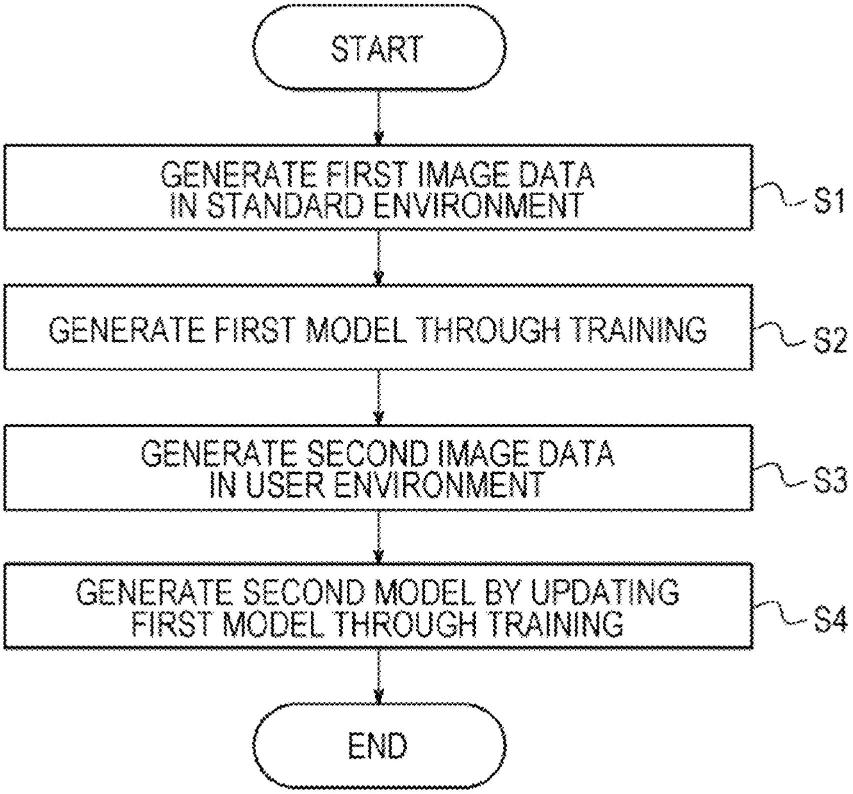
FIG. 6 is a flowchart illustrating an example procedure of a trained model generating method according to an embodiment.
Figure 7:
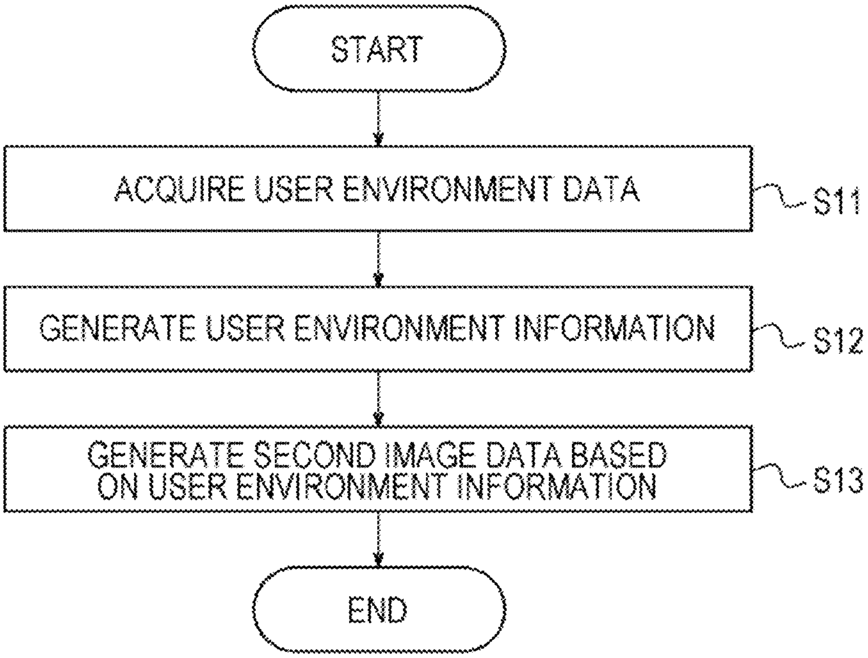
FIG. 7 is a flowchart illustrating an example procedure for generating second image data based on user environment information.

The first controller 120 of the first trained model generating device 110 and the second controller 220 of the second trained model generating device 210 may execute a trained model generating method including the procedures of the flowcharts illustrated in FIG. 6 and FIG. 7. The trained model generating method may be realized as a trained model generating program to be executed by the processors constituting the first controller 120 and the second controller 220. The trained model generating program may be stored on a non-transitory computer readable medium.

The first controller 120 and the second controller 220 generate a trained model by executing the procedure of the flowchart illustrated in FIG. 6. The first controller 120 generates the first image data in the standard environment (Step S1). The first controller 120 generates the first model by performing training processing using the first image data as learning data and a recognition target represented in first learning data as teacher data (Step S2). The second controller 220 generates the second image data in the user environment (Step S3). The second controller 220 updates the first model and generates the second model by performing training processing using the second image data as learning data and the recognition target represented in second learning data as teacher data (Step S4). The second controller 220 outputs the second model as a trained model. The first controller 120 and the second controller 220 finish executing the procedure of the flowchart in FIG. 6 after executing the procedure of Step S4.

The third controller 320 may generate the second image data in the procedure of Step S3 in FIG. 6 based on the user environment information. The third controller 320 may generate the user environment information and generate the second image data based on the user environment information by executing the procedure of the flowchart illustrated in FIG. 7. The third controller 320 acquires the user environment data (Step S11). The third controller 320 generates the user environment information based on the user environment data (Step S12). The third controller 320 generates the second image data based on the user environment information (Step S13). After the execution of the procedure of Step S13, the third controller 320 terminates the execution of the procedure of the flowchart in FIG. 7 and proceeds to the procedure of Step S4 in FIG. 6.

SUMMARY

As described above, the trained model generating system 1, and the first trained model generating device 110 and the second trained model generating device 210 according to this embodiment generate the first model and the second model separately, and generate the second model by updating the first model based on the user environment information. The first trained model generating device 110 and the second trained model generating device 210 can improve the robustness of the trained model generated as the second model by generating the second model by updating the first model based on the user environment information.

The first trained model generating device 110 and the second trained model generating device 210 may generate, in the standard environment, a first model that is to be commonly used for multiple user environments to generate second models as trained models that can be applied to the multiple user environments. The first trained model generating device 110 and the second trained model generating device 210 can generate each second model by updating the first model through training based on information about the corresponding user environment in order to generate the second models that can be applied to the respective user environments after generating the first model. In other words, the first model is a common model for generating second models that each correspond to a respective one of the multiple user environments. The computational load for training for generating the second models that can be applied to the individual user environments can be reduced by performing training to generate the common first model. In addition, the versatility of the first model can be increased by using the common first model.

The trained model generating system 1 may further include a third trained model generating device. A third model may be generated for a different user environment from the second model. The third trained model generating device may have substantially the same configuration as the second trained model generating device 210. The third model may be generated using substantially the same method as the second model. A first model may be generated, in the standard environment, that is to be commonly used for each user environment to generate trained models that are to be applied to individual user environments such as the second model and the third model. After the first model has been generated, the second trained model generating device 210 and the third trained model generating device can generate the second model and the third model by updating the first model through training based on information about the corresponding user environments in order to generate the second model and the third model that are to be applied to the corresponding user environments. In other words, the first model is a common model used to generate the second model and the third model for the corresponding user environments. The computational load for training for generating the second model and the third model that can be applied to the respective user environments can be reduced by performing common training to generate the first model. In addition, the versatility of the first model can be increased by using the common first model. The third model, for example, may be generated on a case-by-case basis. The third model does not need to be generated at the same time as the second model. Even if the second model is generated by updating the first model in order to generate the third model, the first model may still be stored as the first model. The trained model generating system 1 may include the same number of trained model generating devices as user environments, and may generate the same number of trained models as user environments.

The trained model generating system 1 may further include a fourth trained model generating device. A fourth model may be generated based on the second model. For example, the controller of the fourth trained model generating device may acquire a captured image of the user environment and generate the fourth model based on the acquired captured image of the user environment without performing further training processing on the second model. For example, the fourth model may be generated by connecting to the second model an additional trained model that is different from the second model and has undergone training processing for the captured image in the user environment.

With the trained model generating system 1 and the first trained model generating device 110 and the second trained model generating device 210 according to this embodiment, the versatility and robustness of the trained models can be ensured.

OTHER EMBODIMENTS

Other embodiments are described below.

<Examples of Appearance of Recognition Target>

Lighting conditions in the user environment affect the appearance of an object, such as the marker 51, in the user environment. Differences in the appearance of the marker 51 under different lighting conditions are described below.

<<Example of Appearance of Marker 51 Illuminated by Parallel Light>>

Figure 8:
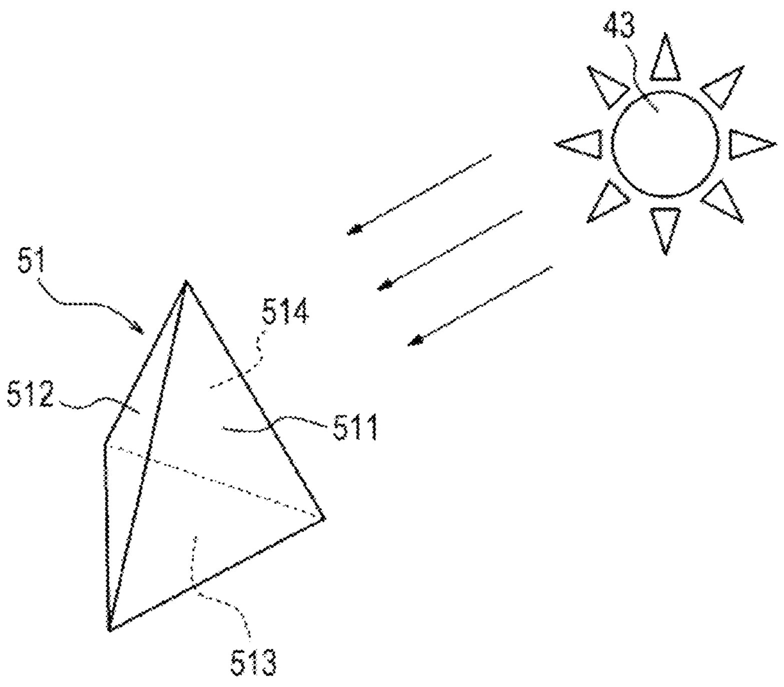
FIG. 8 is a schematic diagram illustrating an example configuration in which a marker is illuminated by parallel light.

Let us assume that, as illustrated in FIG. 8, the marker 51 is illuminated by parallel light with sunlight 43 serving as the source of light. Let use assume that the marker 51 is a triangular pyramid having a first surface 511, a second surface 512, a third surface 513, and a fourth surface 514. In FIG. 8, the image-capturing device 40 is positioned in the front of the page and faces the region behind the page in order to capture an image of the marker 51.

Figure 9A:
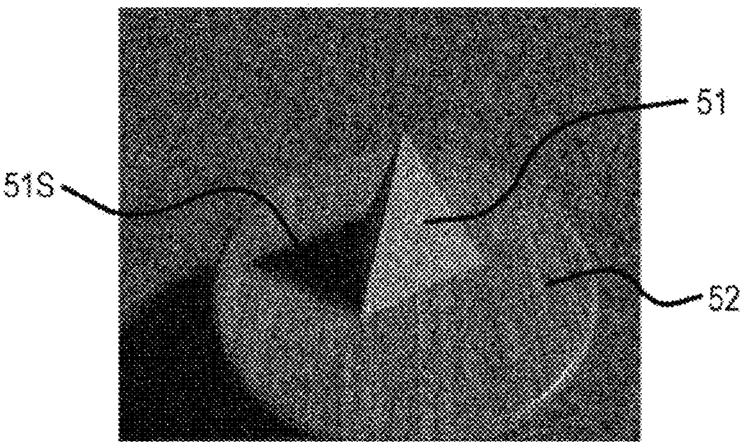
FIG. 9A is an example image of a triangular pyramid marker illuminated by parallel light.

The first surface 511 (see FIG. 8) and the second surface 512 (see FIG. 8) of the marker 51 are visible in the image illustrated in FIG. 9A. The brightness of the first surface 511, which is positioned nearer the lighting, is higher than the brightness of the second surface 512. The shadow 51S of the marker 51 is created on the table 52 due to the marker 51 being illuminated by the parallel light. The third controller 320 of the user environment estimating device 310 may estimate the lighting conditions under which the marker 51 is illuminated based on the image illustrated in FIG. 9A. The third controller 320 may estimate the lighting conditions based on the shape of the shadow 51S or the darkness of the shadow 51S. The third controller 320 may estimate not only the lighting conditions, but also the characteristics of the image-capturing device 40 or information about objects other than the recognition target such as the table 52 or the floor. The third controller 320 may generate or acquire the estimation results as user environment information.

Figure 9B:
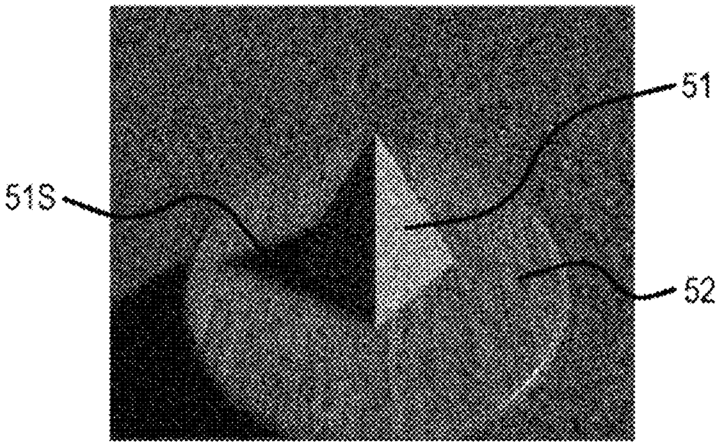
FIG. 9B is an example image of a quadrangular pyramid marker illuminated by parallel light.
Figure 9C:
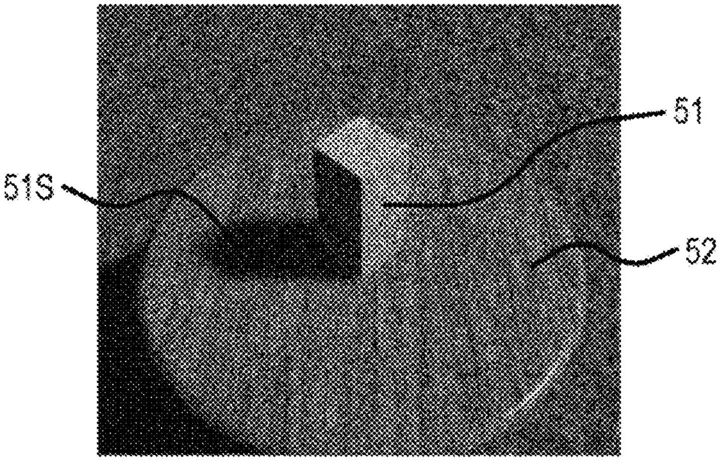
FIG. 9C is an example image of a quadrangular pillar marker illuminated by parallel light.

As an example of a marker 51 having another shape, FIG. 9B illustrates an image of a quadrangular pyramid marker 51. FIG. 9C illustrates an image of a quadrangular pillar marker 51. The third controller 320 may generate or acquire user environment information based on images of the various markers 51.

<<Example of Appearance of Marker 51 Illuminated by Spotlight 44>>

Figure 10:
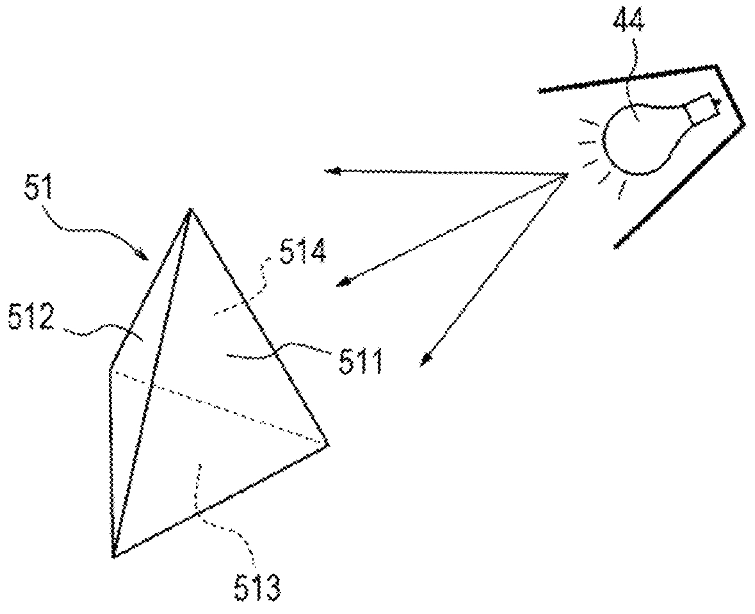
FIG. 10 is a schematic diagram illustrating an example configuration in which a marker is illuminated by a spotlight.

As illustrated in FIG. 10, let us assume that the marker 51 is illuminated only in the region around the marker 51 by illumination light spreading in a radiating manner with the spotlight 44 as the source of the illumination light. Let use assume that the marker 51 is a triangular pyramid having the first surface 511, the second surface 512, the third surface 513, and the fourth surface 514. In FIG. 10, the image-capturing device 40 is positioned in the front of the page and faces the region behind the page in order to capture an image of the marker 51.

Figure 11:
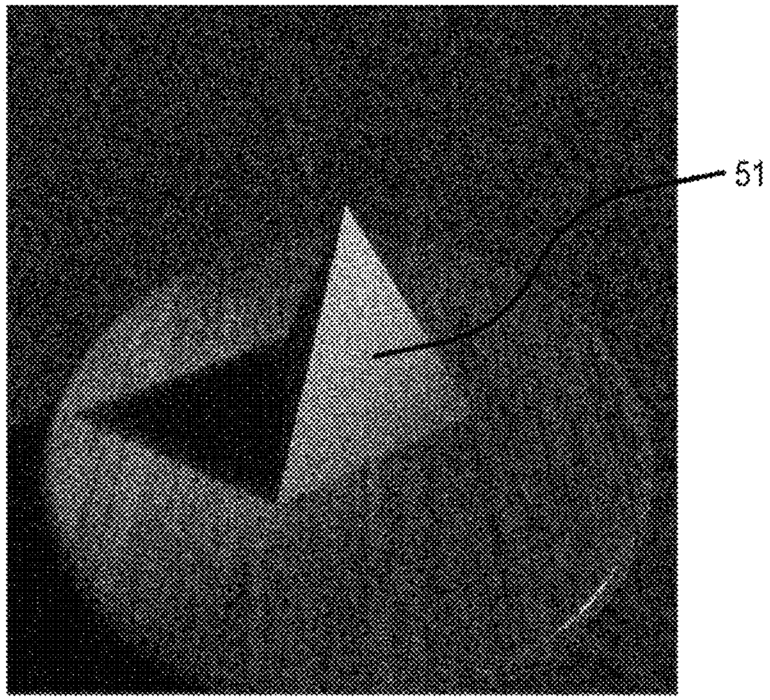
FIG. 11 is an example of an image of a triangular pyramid marker illuminated by a spotlight.

The first surface 511 (see FIG. 10) and the second surface 512 (see FIG. 10) of the marker 51 are visible in the image illustrated in FIG. 11. The brightness of the first surface 511, which is positioned nearer the lighting, is higher than the brightness of the second surface 512. A shadow of the marker 51 is created on the table 52 as a result of the marker 51 being illuminated by the illumination light. The table 52 is brightened only in the vicinity of the marker 51 due to being illuminated only in the region around the marker 51 by the radial illumination light. In addition, the shadow appears to be doubled due to diffraction of the illumination light.

The third controller 320 may estimate the lighting conditions under which the marker 51 is illuminated based on the image illustrated in FIG. 11. The third controller 320 may estimate the lighting conditions based on the shapes of the shadows of the marker 51 or the darkness of the shadows of the marker 51. The third controller 320 may estimate not only the lighting conditions, but also the characteristics of the image-capturing device 40 or information about objects other than the recognition target such as the table 52 or the floor. The third controller 320 may generate or acquire the estimation results as user environment information.

<<Example of Appearance of Marker 51 Illuminated from Two Directions by Spotlights 44>>

Figure 12:
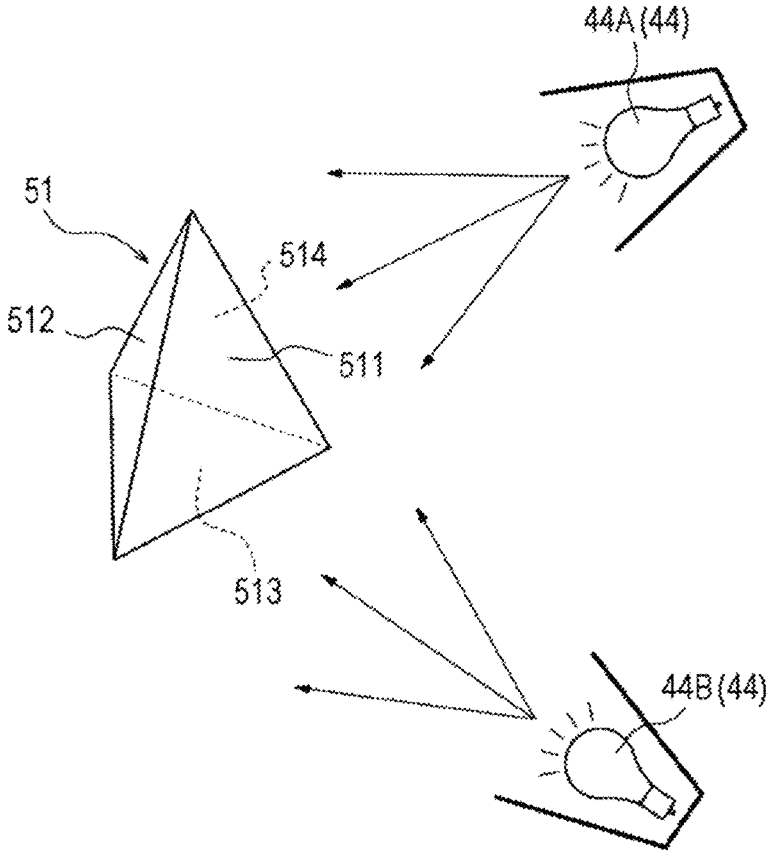
FIG. 12 is a schematic diagram illustrating an example configuration in which a marker is illuminated by spotlights from two directions.

As illustrated in FIG. 12, let us assume that the marker 51 is illuminated from two directions by illumination light with a first spotlight 44A and a second spotlight 44B as the light sources. Let us assume that the marker 51 is a triangular pyramid having the first surface 511, the second surface 512, the third surface 513, and the fourth surface 514. In FIG. 12, the image-capturing device 40 is positioned in the front of the page and faces the region behind the page in order to capture an image of the marker 51.

Figure 13:
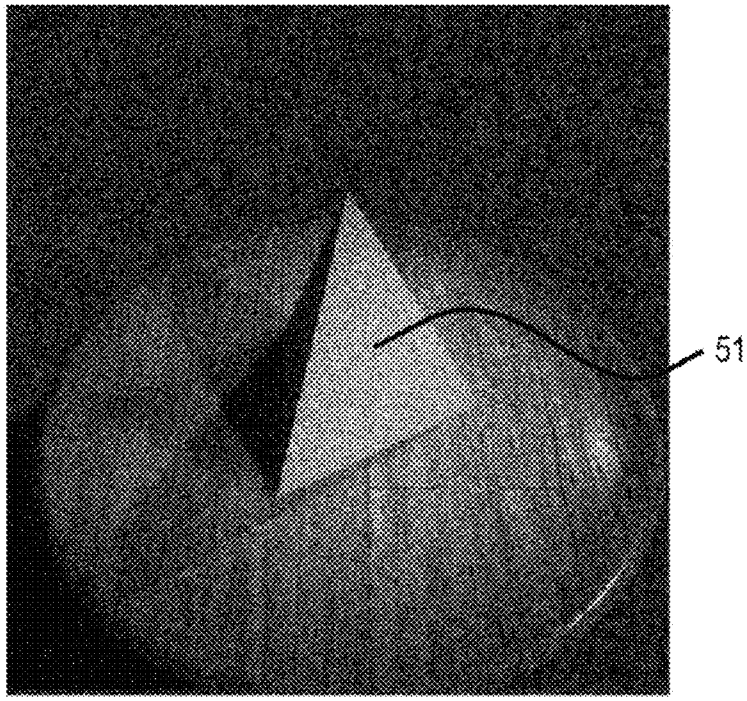
FIG. 13 is an example of an image of a triangular pyramid marker illuminated by spotlights from two directions.

The first surface 511 (see FIG. 12) and the second surface 512 (see FIG. 12) of the marker 51 are visible in the image illustrated in FIG. 13. The brightness of the first surface 511, which is positioned nearer the lighting, is higher than the brightness of the second surface 512. Shadows of the marker 51 that extend in three directions are created on the table 52 as a result of the marker 51 being illuminated with illumination light. Specifically, a shadow corresponding to illumination light from the first spotlight 44A, a shadow corresponding to the second spotlight 44B, and a shadow that is a composite of these two shadows are created on the table 52.

The third controller 320 may estimate the lighting conditions under which the marker 51 is illuminated based on the image illustrated in FIG. 13. The third controller 320 may estimate the lighting conditions based on the shapes of the shadows of the marker 51 or the darkness of the shadows of the marker 51. The third controller 320 may estimate not only the lighting conditions, but also the characteristics of the image-capturing device 40 or information about objects other than the recognition target such as the table 52 or the floor. The third controller 320 may generate or acquire the estimation results as user environment information.

SUMMARY

The third controller 320 can estimate lighting conditions and so forth in various user environments based on an image of the marker 51. The third controller 320 can generate or acquire user environment information based on estimation results. The marker 51 may be disposed so that at least two surfaces of the marker 51 are captured by the image-capturing device 40. The image-capturing device 40 may be configured to capture an image of the marker 51 from at least two directions.

<Extended Environment Information>

The second controller 220 of the second trained model generating device 210 or the third controller 320 of the user environment estimating device 310 generates the second image data based on the user environment information as described above. The second controller 220 or the third controller 320 may generate information in which each parameter of the user environment information is varied within a prescribed range. The prescribed ranges may be set, for example, to the ranges, in the user environment, over which the environment information changes during the time period in which recognition using the second model is performed. Information in which at least one parameter, among the multiple parameters, of the user environment information is varied is also referred to as extended environment information. The second controller 220 or the third controller 320 may generate multiple sets of extended environment information and generate second image data that includes an image in which the appearance of the recognition target is assumed for each set of extended environment information. The robustness of a trained model can be improved by performing training using images in which the appearance of the recognition target is assumed in the extended environment information as teacher data.

<User Environment Estimating Device 310>

The user environment estimating device 310 acquires image data obtained by capturing images of prescribed objects in the user environment. The prescribed objects may include the recognition target itself or an object different from the recognition target such as the marker 51. The user environment estimating device 310 may acquire image data using image-capturing means, or may acquire the image data from the outside. The user environment estimating device 310 estimates the user environment based on the image data.

The user environment estimating device 310 may estimate the user environment based on image data obtained by capturing a prescribed object from multiple directions. The user environment estimating device 310 may also estimate the user environment based on a captured image of at least two of the multiple surfaces of a prescribed object. The user environment estimating device 310 may also estimate the user environment based on images of two different surfaces of the prescribed object captured from at least two directions.

User environment information is more easily collected as a result of the user environment estimating device 310 being able to generate user environment information.

The functions of the user environment estimating device 310 may be realized as a user environment estimating method executed by the user environment estimating device 310. The functions of the user environment estimating device 310 may be realized as a user environment estimating program that is executed by a processor included in the user environment estimating device 310. For example, the user environment estimating program can estimate the user environment by comparing user environment data with reference data representing a predefined basic environment. The user environment estimating program and reference data may be stored in the third data holding unit 333 or the fourth data holding unit 334.

<Examples of Noise Factors>

As described above, the trained model generating system 1 according to this embodiment generates trained models taking into account noise that occurs in the appearance of a recognition target in the user environment with respect to the standard appearance of the recognition target. Hereafter, a configuration used to acquire image data will be described as an example of a factor that causes noise to be generated.

In an image data acquisition configuration for acquiring optical target images as digital data, the illumination light source strikes the target, the reflected light is converted to a photoelectric signal by an optical sensor (image-capturing element or the like) of a camera (image-capturing device 40 or the like), the electric signal is converted to digital data, and thus, image data is acquired. Therefore, the image data is affected by various optical or electrical variations and noise.

Noise in the image data includes noise caused by the camera. Noise caused by the camera includes, for example, color variations and noise due to the ISO sensitivity of the optical sensor, or brightness variations and noise. Cameras ensure dynamic range by varying the ISO sensitivity (amplification factor) of the optical sensor based on input state of light when capturing images. An increase in the sensitivity of the optical sensor can result in increased noise. The shutter speed and aperture of the camera are parameters that alter the input state of light and are related to ISO sensitivity. These parameters can be easily referenced by being embedded in the image data as Exif (Exchangeable Image File Format) data. Noise caused by the camera includes color reproducibility variations and noise due to limitations in the color reproduction range of the optical sensor. Noise caused by the camera includes distortion variations and noise in optical systems such as optical lenses, or vignetting variations and noise. Noise caused by the camera also includes noise based on the way in which the camera is held, for example, blurring (vibration) noise between the camera and a camera holding member due to ambient vibration effects.

Noise in the image data includes noise caused by lighting. Noise caused by lighting includes, for example, shadow noise of the target associated with the lighting position (the coordinates of the lighting). Noise caused by lighting includes contrast variations and noise of the target due to the light source type (for example, parallel light or scattered light), or shadow noise of the target. Noise caused by lighting includes contrast variations and noise of the target due to illuminance (brightness), or shadow noise of the object. Noise caused by lighting includes color shift variations and noise due to the color temperature of the lighting. Noise caused by lighting includes variations in light flicker and noise caused by the type of lighting or luminance adjustment and so on.

Noise in the image data includes noise caused by a work table such as the table 52. Noise caused by a work table includes variations in reflectance due to the surface condition of the work table or noise caused by reflected light from the surface of the work table. Noise caused by the work table includes noise that is poorly separated from the target due to the color of the work table.

Noise in the image data includes noise caused by the target. Noise caused by the target includes variations in reflectance due to the surface condition of the target, or noise caused by reflected light.

The second controller 220 of the second trained model generating device 210 or the third controller 320 of the user environment estimating device 310 may estimate each factor of noise in the image data described above based on the user environment data and generate the user environment information. The second controller 220 or the third controller 320 may estimate some or all of the multiple factors of noise in the image data. In other words, the second controller 220 or the third controller 320 may estimate at least some of the multiple factors of noise in the image data. Noise caused by each of the above-described factors has a significant impact on recognition of the target. The trained model generating system 1 according to this embodiment can generate a trained model by performing training using teacher data that takes these types of noise into consideration. As a result, the robustness of the trained model can be improved.

<Example of Structure of Marker 51>

As described above, the trained model generating system 1 according to this embodiment can generate a trained model tailored to each user environment based on the user environment information. The user environment information can be generated based on captured images of the marker 51 in the user environment. Hereafter, an example of the structure of the marker 51 will be described.

In the case where target images are acquired as digital data, the user's image acquisition environment is affected by various optical or electrical variations and noise. Therefore, acquiring the user environment is necessary in order to improve robustness.

In order to acquire the user environment, the marker 51 having the following three-dimensional structure may be used, for example. The marker 51 may be a polyhedral structure and may have at least three surfaces. The marker 51 may have a structure that, when illuminated by lighting, allows the shading of shadows produced on each surface to be determined. Specifically, the marker 51 may have ridges that define the boundaries of each surface. The marker 51 may have a structure that allows the reflectance of light on each surface to be determined. The marker 51 may have a structure that allows the size of the marker 51 to be known, for example, a marker or dimensional scale indicating the specified size. The marker 51 may include a grid pattern or the like so as to allow identification of distortion and other characteristics of the optical system of the image-capturing means. The marker 51 may include a portion that results in a known darkness, for example, a grayscale of 18%. The marker 51 may include a portion that results in a white dot.

The marker 51 may be disposed so that at least two surfaces of the marker 51 are captured by the image-capturing means. The marker 51 may be disposed so that the marker 51 is captured from at least two or more directions having different angles.

The second controller 220 of the second trained model generating device 210 or the third controller 320 of the user environment estimating device 310 may estimate, for example, the lighting position, the luminance, brightness, or illuminance of the lighting, or the type of light source as lighting conditions in the user environment based on the image data of the marker 51. The second controller 220 or the third controller 320 may also estimate the reflectance of the marker 51 or objects such as a work table that are present around the marker 51. The second controller 220 or the third controller 320 may estimate the lighting position based on the size and the shadow of the marker 51. The second controller 220 or the third controller 320 may estimate the luminance of the lighting based on the density of the image of the marker 51 and the ISO sensitivity, shutter speed, or aperture of the camera. The second controller 220 or the third controller 320 may estimate the contrast based on image data of an edge portion of the marker 51 and image data of an edge portion of the shadow, and may estimate lighting conditions such as the type of light source of the lighting (for example, parallel light or scattered light). The second controller 220 or the third controller 320 may estimate the lighting conditions based on the pixel density distributions of the edge portion of the marker 51 and the edge portion of the shadow. The second controller 220 or the third controller 320 may estimate the reflectance of the marker 51 based on a reflection image of the marker 51. The second controller 220 or the third controller 320 may estimate information about an object in the surroundings that is reflected in the marker 51 based on the reflection image of the marker 51. The second controller 220 or the third controller 320 may estimate the color temperature or spectrum of the lighting based on an image of a white point of the marker 51. The second controller 220 or the third controller 320 may estimate the distortion of the optical system of the image-capturing means based on an image of a grid pattern of the marker 51.

Other Example Configurations

Hereafter, configurations that may be employed as features of the trained model generating system 1 according to this embodiment will be described. The trained model generating system 1 can be configured to, in target recognition for recognizing a target, perform first recognition to recognize a target in the standard environment and second recognition to recognize a target in the user environment, and can be configured to improve recognition of the target in the first recognition and increase the robustness of recognition in the user environment in the second recognition by first recognizing the target in the first recognition and then recognizing the target in the second recognition. The trained model generating system 1 may store at least a target recognition algorithm or a target recognition algorithm and a target dataset in the first recognition. In the trained model generating system 1, standard environment target data generating means for the first recognition may consist of lighting and a lighting holding member for holding the lighting, a target and a member for holding the target, and an image conversion system for converting the target into data. The lighting of the standard environment target data generating means of the first recognition may be configured with two or more lights. The lighting of the standard environment target data generating means of the first recognition may be configured such that the color temperature of the lighting can be adjusted. An image conversion system for converting a target of the standard environment target data generating means of the first recognition into data may be configured to generate data based on a two-dimensional color image or a three-dimensional color image and distance data. The standard environment target data generating means of the first recognition may be configured in a virtual environment. In the second recognition, the target recognition algorithm, which was sufficiently trained for target recognition and retained in the first recognition, or the target recognition algorithm and the target dataset may be copied at the beginning of the recognition training in the second recognition. User environment target data generating means of the second recognition may be configured to create the user environment based on the estimation results of the user environment and perform recognition. The user environment based on the estimation results of the user environment produced by the user environment target data generating means of the second recognition may consist of lighting and a lighting holding member for holding the lighting, a target and a member for holding the target, and an image conversion system for converting the target into data. The lighting of the user environment target data generating means of the second recognition may be configured with two or more lights. The lighting of the user environment target data generating means of the second recognition may be configured such that the color temperature of the lighting can be adjusted. The image conversion system for converting the target of the user environment target data generating means of the second recognition into data may be configured to generate data based on a two-dimensional color image or a three-dimensional color image and distance data. In the second recognition, the target may be recognized by configuring a virtual user environment based on the estimation results of the user environment.

In the first recognition and the second recognition, the standard environment and the user environment may share some environmental elements. That is, for example, if lighting is also included as an environmental element when generating the first image data taking the standard environment into account, lighting may also be included as an environmental element when generating the second image data taking the user environment into account. Data representing the standard environment and the user environment may be the same type of data. In this case, for example, the standard environment or the user environment can be used in the same or similar software.

The user environment may include means for measuring the user environment and means for estimating the user environment from information obtained from the measuring means. The means for measuring the user environment may be configured to hold a three-dimensional object and acquire user environment data such as physical information (size, density, reflection) about the object and image data of the three-dimensional object from two or more different angles. User environment information such as lighting position, number of lights, luminance, light source type, or reflectance may be estimated by the environment estimating means from the user environment data. The means for estimating the user environment from the user environment data may be configured to estimate the user environment geometrically from two sets of image data. A three-dimensional object for measuring the user environment may include a white object. A white object may be disposed in the vicinity of the three-dimensional object. The three-dimensional object for measuring the user environment may include a grayscale density object. A grayscale density object may be disposed in the vicinity of the three-dimensional object. The reflectance of the grayscale density object may be 18%. Image data of the three-dimensional object may include a two-dimensional color image or a three-dimensional color image and distance data.

The trained model generating system 1 may be configured to store or accumulate user environment data. The trained model generating system 1 may be configured to store or accumulate user environment information.

In the trained model generating system 1, the user environment target recognition unit 224 and the standard environment target recognition unit 122 may have identical or similar configurations. Even if the user environment target recognition unit 224 and the standard environment target recognition unit 122 are identical, the training results may differ depending on the input standard environment data or user environment data.

The first trained model generating device 110 and the second trained model generating device 210 may be configured as identical devices. The timing at which the first trained model generating device 110 performs first training to generate the first model and the timing at which the second trained model generating device 210 performs second training to generate the second model may be different timings.

The standard environment target data generator 121 and the user environment target data generator 223 may be configured as a common target data generator. The target data generator, which functions as the standard environment target data generator 121, generates standard environment target data by reading standard environment information. The user environment target data generator, which functions as the user environment target data generator 223, generates user environment target data by reading user environment information.

The functions of the user environment estimating unit 326 of the third controller 320 of the user environment estimating device 310 may be realized by the second controller 220 of the second trained model generating device 210. In this case, the functions of the fourth data holding unit 334 of the third storage unit 330 of the user environment estimating device 310 are realized by the second storage unit 230 of the second trained model generating device 210. Let us assume that the second trained model generating device 210 is owned by a vendor that supplies trained models. Let us also assume that the user environment estimating device 310 is owned by a user who performs recognition using a trained model. In this case, the functions of the user environment estimating unit 326 are realized by the second trained model generating device 210, and this allows the user environment to be estimated on the vendor's side. In other words, there is no longer a need for user environment estimation on the user's side. User convenience is improved.

Although embodiments according to the present disclosure have been described based on the drawings and examples, please note that one skilled in the art can make various variations or changes based on the present disclosure. Please note that, therefore, these variations or changes are included within the scope of the present disclosure. For example, the functions and so on included in each constituent part can be rearranged in a logically consistent manner, and multiple constituent parts and so on can be combined into one part or divided into multiple parts.

All of the constituent elements described in the present disclosure and/or all of the disclosed methods or all of the steps of disclosed processing can be combined in any combination, except for combinations in which their features are mutually exclusive. Each of the features described in the present disclosure may be replaced by alternative features that serve the same, equivalent, or similar purposes, unless explicitly stated to the contrary. Therefore, unless explicitly stated to the contrary, each of the disclosed features is only one example of a comprehensive set of identical or equivalent features.

Furthermore, the embodiments according to the present disclosure are not limited to any of the specific configurations of the embodiments described above. The embodiments according to the present disclosure can be extended to all novel features, or combinations thereof, described in the present disclosure, or all novel methods, or processing steps, or combinations thereof, described in the present disclosure.

Part of the methods according to the present disclosure may be performed manually by humans. For example, an instruction to begin work on generating a training model could be executed manually. In addition, specifying a folder where a training dataset is to be stored could be performed manually. The trained model generating system 1, a trained model generating device such as the first trained model generating device 110 or the second trained model generating device 210, or the user environment estimating device 310 according to the present disclosure may be configured to accept input concerning what a person is intending to perform manually. For example, the trained model generating system 1 may be communicatively connected to the trained model generating device or the user environment estimating device 310, and may also include an input device that accepts user input. The trained model generating device or the user environment estimating device 310, for example, may include an input unit that accepts user input. As a result, the trained model generating system 1 and so on can accept a user's instruction to start work or can accept a user input specifying where to store the learning data during training processing. The input device or input unit may include, for example, a touch panel or a touch sensor, or a pointing device such as a mouse. The input device or input unit may include physical keys or a voice input device such as a microphone.

The present disclosure can also be implemented as a trained model generating device. Specifically, a trained model generating device of an embodiment includes (1) a controller, wherein the controller is configured to acquire a first model obtained by performing training processing for an estimation target in a first environment by using first image data representing the estimation target in the first environment as learning data;

acquire second image data representing the estimation target in a second environment in which estimation is to be performed;

generate a second model based on the first model by using the second image data as learning data; and output a trained model based on the second model, and the second image data includes an image in which an appearance of the estimation target in the second environment is assumed based on user environment information about the second environment.

(2) In the trained model generating device of (1), the first environment may be an environment that at least reduces an effect of a shadow caused by a position of a light source on a captured image of the estimation target or an image in which an appearance of the estimation target is assumed.

(3) In the trained model generating device of (1) or (2), the controller may acquire, as the user environment information, information specifying a factor responsible for noise that occurs in the second image data in the second environment.

(4) In the trained model generating device of any one of (1) to (3), the controller may acquire, as the user environment information, information specifying a factor causing a difference between the first image data and the second image data.

(5) In the trained model generating device of any one of (1) to (4), the controller may acquire, as the user environment information, information on a position of a light source in the second environment, an intensity of light radiated from the light source, and a light source type specifying whether the light source is a point light source system or a scattered light system.

(6) In the trained model generating device of any one of (1) to (5), the controller may acquire, as the user environment information, information on an optical property of a table on which the estimation target is disposed in the second environment.

(7) In the trained model generating device of any one of (1) to (6), the controller may acquire, as the user environment information, information on an image-capturing parameter of image-capturing means used in recognition of the estimation target in the second environment.

(8) In the trained model generating device of any one of (1) to (7), the controller may acquire, as the user environment information, information on vibration of image-capturing means used in recognition of the estimation target in the second environment.

(9) In the trained model generating device of any one of (1) to (8), the controller may generate multiple sets of extended environment information, a corresponding parameter of the user environment information being varied within a prescribed range in each set, and may generate the second image data for each set of extended environment information.

The present disclosure can also be implemented as a user environment estimating device. Specifically, a user environment estimating device of an embodiment includes

(10) a controller configured to estimate a user environment, the user environment being an environment in which data on an estimation target is to be acquired, and the controller outputs a result of estimating the user environment based on image data obtained by capturing a prescribed object in the user environment as user environment information about the user environment.

(11) In the user environment estimating device of (10), the controller may estimate the user environment based on image data obtained by capturing an object different from the estimation target as the prescribed object in the user environment.

(12) In the user environment estimating device of (10) or (11), the controller may estimate the user environment based on image data obtained by capturing the estimation target as the prescribed object in the user environment.

(13) In the user environment estimating device of any one of (10) to (12), the controller may estimate the user environment based on image data obtained by capturing the prescribed object from each of multiple directions.

(14) In the user environment estimating device of any one of (10) to (13), the image data may include an image in which at least two surfaces among multiple surfaces of the prescribed object are captured, or images in which two different surfaces of the prescribed object are captured from at least two different directions.

The present disclosure can also be implemented as a trained model generating program. Specifically, a trained model generating program of an embodiment is configured to cause a trained model generating device to

(15) acquire a first model obtained by performing training processing for an estimation target in a first environment by using first image data representing the estimation target in the first environment as learning data;

acquire second image data representing the estimation target in a second environment in which estimation is to be performed;

generate a second model based on the first model by using the second image data as learning data; and output a trained model based on the second model, and the second image data includes an image in which an appearance of the estimation target in the second environment is assumed based on user environment information about the second environment.

The present disclosure can also be implemented as a user environment estimating program. Specifically, a user environment estimating program of an embodiment includes

(16) outputting a result of estimating the user environment based on image data obtained by capturing a prescribed object in the user environment as user environment information about the user environment.

The present disclosure can also be implemented as a trained model generating system. Specifically, a trained model generating system of an embodiment includes

(17) the trained model generating device of any one of (1) to (9) and the user environment estimating device of any one of (10) to (14). The trained model generating device acquires user environment information estimated by the user environment estimating device from the user environment estimating device.

REFERENCE SIGNS

1 trained model generating system
40 image-capturing device (40A: first image-capturing device, 40B: second image-capturing device)
41 standard lighting
42 user lighting
43 sunlight
44 spotlight (44A: first spotlight, 44B: second spotlight)
50 cup (50S: shadow of cup)
51 marker (51S: shadow of marker, 511 to 514: first to fourth surfaces)
52 table
100 first environment (standard environment)
110 first trained model generating device (120: first controller, 121: standard

110 environment target data generator, 122: standard environment target recognition unit, 130: first storage unit, 131: first data holding unit)

200 second environment (user environment)

210 second trained model generating device (220: second controller, 223: user environment target data generator, 224: user environment target recognition unit, 230: second storage unit, 232: second data holding unit)

310 user environment estimating device (320: third controller, 325: user environment acquiring unit, 326: user environment estimating unit, 330: third storage unit, 333: third data holding unit, 334: fourth data holding unit)

The invention claimed is:

1. A trained model generating method comprising:

acquiring a first model obtained by using first image data as learning data to perform training processing for an estimation target, the first image data representing the estimation target in the first environment;

acquiring second image data representing the estimation target in a second environment in which estimation is to be performed;

generating a second model based on the first model by using the second image data as learning data; and outputting a trained model based on the second model, wherein the second image data includes an image in which an appearance of the estimation target in the second environment is represented based on user environment information about the second environment; and wherein the first environment is an environment that at least reduces an effect of a shadow caused by a position of a light source on a captured image of the estimation target or an image in which an appearance of the estimation target is represented.

2. The trained model generating method according to claim 1, further comprising:

acquiring, as the user environment information, information specifying a factor responsible for noise that occurs in the second image data in the second environment.

3. The trained model generating method according to claim 1, further comprising:

acquiring, as the user environment information, information specifying a factor causing a difference between the first image data and the second image data.

4. The trained model generating method according to claim 1, further comprising:

acquiring, as the user environment information, information on a position of a light source in the second environment, an intensity of light radiated from the light source, and a light source type specifying whether the light source is a point light source system or a scattered light system.

5. The trained model generating method according to claim 1, further comprising:

acquiring, as the user environment information, information on an optical property of a table on which the estimation target is disposed in the second environment.

6. The trained model generating method according to claim 1, further comprising:

acquiring, as the user environment information, information on an image-capturing parameter of image-capturing means used in recognition of the estimation target in the second environment.

7. The trained model generating method according to claim 1, further comprising:

acquiring, as the user environment information, information on vibration of image-capturing means used in recognition of the estimation target in the second environment.

8. The trained model generating method according to claim 1, further comprising:

generating multiple sets of extended environment information, wherein in each set of the multiple sets, a corresponding parameter of the user environment information is varied within a prescribed range, and generating the second image data for each set of the multiple sets of extended environment information.

9. The trained model generating method according to claim 1, further comprising:

estimating a user environment based on image data obtained by capturing a prescribed object in the user environment, the user environment being an environment in which data on the estimation target is to be acquired, and outputting an estimation result of the user environment as user environment information about the user environment.

10. The trained model generating method according to claim 9, further comprising:

estimating the user environment based on image data obtained by capturing an object different from the estimation target as the prescribed object in the user environment.

11. The trained model generating method according to claim 9, further comprising:

estimating the user environment based on image data obtained by capturing the estimation target as the prescribed object in the user environment.

12. The trained model generating method according to claim 9, further comprising:

estimating the user environment based on image data obtained by capturing the prescribed object from each of multiple directions.

13. The trained model generating method according to claim 9, wherein the image data includes an image in which at least two surfaces among multiple surfaces of the prescribed object are captured, or images in which two different surfaces of the prescribed object are captured from at least two different directions.

14. A trained model generating device comprising:

a controller, wherein the controller is configured to acquire a first model obtained by using first image data as learning data to perform training processing for an estimation target, the first image data representing the estimation target in a first environment, acquire second image data representing the estimation target in a second environment in which estimation is to be performed, generate a second model based on the first model by using the second image data as learning data; and output a trained model based on the second model, and wherein the second image data includes an image in which an appearance of the estimation target in the second environment is represented based on user environment information about the second environment, wherein the first environment is an environment that at least reduces an effect of a shadow caused by a position of a light source on a captured image of the estimation target or an image in which an appearance of the estimation target is represented.

15. A trained model generating system comprising:

the trained model generating device according to claim 14, and a user environment estimating device, the user environment estimating device comprising a controller configured to estimate a user environment based on image data obtained by capturing a prescribed object in the user environment, the user environment being an environment in which data on an estimation target is to be acquired, and output an estimation result of the user environment as user environment information to the trained model generating device.

* * * * *